Figure 1:
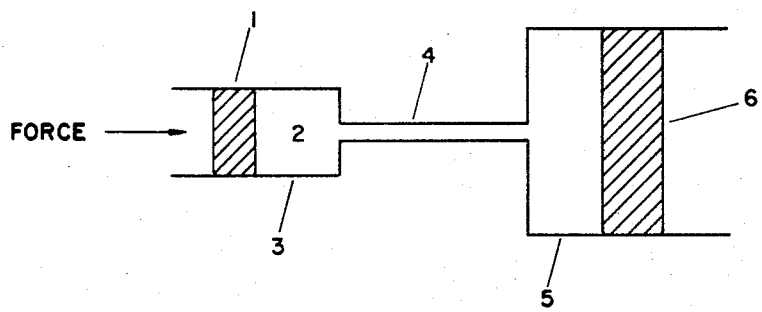

Sept. 5, 1967　　　G. A. RICHARDSON ET AL　　　3,340,331

FLUORINE-CONTAINING PHOSPHINATES

Filed April 30, 1964

INVENTORS
EDWARD S. BLAKE
GEORGE A. RICHARDSON
JAMES A. WEBSTER
BY

*Mary B. Moshier*

ATTORNEY

United States Patent Office 3,340,331
Patented Sept. 5, 1967

3,340,331
FLUORINE-CONTAINING PHOSPHINATES
George A. Richardson, James A. Webster, and Edward S. Blake, Dayton, Ohio, assignors to Monsanto Research Corporation, St. Louis, Mo., a corporation of Delaware
Filed Apr. 30, 1964, Ser. No. 363,760
5 Claims. (Cl. 260—955)

This invention relates to fluorine-containing organic compounds of phosphorus and more particularly provides certain new and valuable fluorine-containing phosphinates and the method of preparing the same. The invention also provides an improved functional fluid comprising the new compounds, and hydraulic pressure devices and methods of actuating the devices by employing said fluids.

The operation of hydraulic mechanisms generally requires a fluid having a combination of properties which most liquids do not possess. This is particularly true when the hydraulic system is designed for use in widely differing environments. The hydraulic fluid must often remain liquid over wide temperature ranges, e.g., at temperatures which may be below, say, $-40°$ F. and above, say, $400°$ F. In many applications, fire-resistance of the fluid is of great concern; and, of course, the fluid should not ignite spontaneously at the operating temperature. In numerous applications, it is important that the hydraulic fluid resist attack by water and/or oxygen and that it be non-corrosive to the mechanical components with which it may come into contact.

The many rigorous requirements have resulted in the provision of numerous specialty compositions whereby, much as in the lubricant and motor fuel arts, additives of various kinds have been admixed with the base fluid for the purpose of imparting to it one or more of the properties in which the base stock is deficient. However, properties such as thermal stability and resistance to hydrolysis generally cannot be conferred upon a fluid by the use of an additive.

Now we have found that certain fluorine-containing phenyl dialkylphosphinates are very useful as operative fluids for hydraulic systems in that they simultaneously possess high thermal stability and improved resistance to hydrolysis.

Such phosphinates have the formula

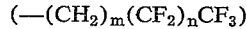

wherein alkyl, ar, $m$ and $n$ are defined above and X is aromatic hydrocarbon radical which is free of olefinic and acetylenic unsaturation, has from 6 to 12 carbon atoms, and is linked through nuclear carbon to the remainder of the molecule, $m$ is a number of 1 to 4 and $n$ is a number of zero to 4.

Compounds of the above formula are readily prepared by the reaction of an appropriate fluorine-containing phenol with an appropriate dialkylphosphinic halide, substantially according to the scheme:

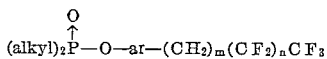 + HO—ar—(CH₂)ₘ(CF₂)ₙCF₃ ⟶

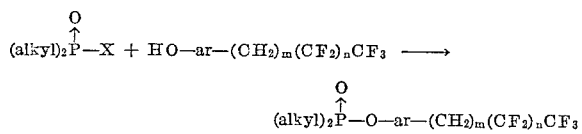

wherein alkyl, ar, $m$ and $n$ are defined above and X is halogen having an atomic weight greater than 34 and less than 126.

The presently useful halides may be simple or mixed dialkylphosphinic chlorides or bromides, e.g., dimethyl-, diethyl-, dibutyl-, diisopropyl-, dipentyl-, dihexyl-, diheptyl-, dioctyl-, ethylmethyl-, butylpentyl-, hexylpropyl or methyloctylphosphinic chloride or bromide. The phenolic reactant has the (perfluoroalkyl)alkyl $$(-(CH_2)_m(CF_2)_nCF_3)$$

radical substituted at a benzene or naphthalene nucleus. Such nuclei may or may not also possess one or more hydrocarbon substituents so long as such substituents are free of olefinic and acetylenic unsaturation and the total number of carbon atoms in absence of said (perfluoroalkyl)alkyl radical is not greater than 12. Examples of presently useful phenols are o-, m or p-(4,4,5,5,6,6,7,7,7-nonafluoroheptyl)phenol, o-, m or p-(5,5,6,6,7,7,7-heptafluoroheptyl)phenol, o-, m or p-(5,5,6,6,7,7,8,8,9,9,9-undecafluorononyl)phenol, α-(4,4,5,5,6,6,6-heptafluorohexyl)β-naphthol, 2-ethyl-4-(4,4,5,5,5-pentafluoropentyl)phenol, 4-[4-(2,2,2-trifluoroethyl)phenyl]phenol, 3-cyclopentyl-4-(5,5,6,6,6-pentafluorohexyl)phenol, 3,5-dimethyl-4-(3,3,4,4,4-pentafluorobutyl)phenol, etc.

Examples of the presently provided (perfluoroalkyl)-alkyl-substituted aryl dialkylphosphinates include the o-, m- or p-(3,3,3-trifluoropropyl)phenyl dipentylphosphinates which are obtained by reaction of o-, m- or p-(3,3,3-trifluoropropyl)phenol and dipentylphosphinic chloride or bromide; the o-, m- or p-(3,3,4,4,5,5,6,6,7,7,7-undecafluoroheptyl)phenyl dibutylphosphinate which is obtained by reaction of o-, m- or p-(3,3,4,4,5,5,6,6,7,7,7-undecafluoroheptyl)phenol and dibutylphosphinic chloride; the o-, m- or p-(5,5,6,6,7,7,8,8,8-heptafluorooctyl)phenyl dimethylphosphinate which is prepared from o-, m- or p-(5,5,6,6,7,7,8,8,8-nonafluorooctyl)phenol and dimethylphosphinic bromide, etc. Also included are o-, m- or p-(2,2,3,3,4,4,5,5,5-nonafluoropentyl)phenyl dibutylphosphinate or diisopropylphosphinate; β-(3,3,3-trifluoropropyl)-α- naphthyl diethylphosphinate or dimethylphosphinate; o-, m- or p-(4,4,5,5,6,6,7,7,8,8,8-undecafluorooctyl) phenyl dibutylphosphinate or bis(2-ethylhexyl)phosphinate; and o-, m- or p-(3,3,4,4,4-pentafluorobutyl) pentylpropylphosphinate.

As hereinabove disclosed, certain hydrocarbon substituents may also be present on the phenyl or naphthyl radical of the phenolic portion, e.g., as in 3-butyl-5-(2,2,2-trifluoroethyl)phenyl dibutylphosphinate which is obtained by reaction of 3-butyl-5-(2,2,2-trifluoroethyl)phenol and dibutylphosphinic chloride or bromide; or as in the 2-(4,4,5,5,6,6,6 - heptafluorohexyl)-3,4,5-(trimethyl)phenyl dipentylphosphinate which is obtained by reaction of 2-(4,4,5,5,6,6,6 - heptafluorohexyl)-3,4,5-(trimethyl)phenol with dipentylphosphinic chloride or bromide; or as in the 3 - cyclohexyl - 4-(5,5,5-trifluoropentyl)phenyl dimethylphosphinate which is obtained by reaction of 3-cyclohexyl-4-(5,5,5-trifluoropentyl)phenol with dimethylphosphinic bromide or chloride.

Reaction of the dialkylphosphinic halide with the (perfluoroalkyl)alkyl-substituted phenol takes place by simply contacting the halide with the phenol at ambient temperature or with heating. In some instances, reaction rate is accelerated by heating; and, particularly when working with the higher molecular weight halides, temperatures of from, say, $50°$ C. to below the decomposition temperature of either the reactants or the ester product are employed. With the lower halides the reaction may be slightly exothermic so that, for smooth reaction, external cooling may be desirable. Generally, depending upon the nature of the individual reactants, temperatures of from, say, $0°$ C. to $150°$ C., and preferably of from about $15°$ C. to $125°$ C. are useful.

The reaction may or may not be conducted in the presence of an inert, organic liquid diluent or solvent, e.g., a halogenated alkane such as chloroform, carbon tetrachloride or ethylene chloride; an ether such as ethyl ether, dioxane, diethylene glycol dimethyl ether; an amide such as dimethylformamide or dimethylacetamide.

A catalyst may or may not be used. Operation in the presence of a basic agent is recommended, since the latter serves as scavenger for the by-product hydrogen halide. The basic agent may be inorganic or organic, e.g., it may be a tertiary alkylamine such as triethylamine or tributylamine; a heterocyclic nitrogen base such as N-methylmorpholine or pyridine; an alkali or alkaline earth metal oxide or the basic salt thereof such as sodium, potassium, lithium, calcium or magnesium oxide, carbonate or acetate, etc.

All of the reaction conditions, i.e., whether or not a diluent and/or a basic agent is employed and the nature of the diluent or of said agent if it is used, temperature, pressure, reaction time, reactant proportions, etc., can be readily arrived at by easy experimentation. Thus, arrival at optimum reaction conditions is simply a matter of routine procedure by one skilled in the art. Reaction is generally rapid and is usually evidenced by evolution of hydrogen halide if no scavenger is used. When an organic amine is employed as scavenger, reaction is frequently evidenced by copious precipitation of the amine hydrohalide. To assure complete reaction in experimental runs, it is generally recommended that after initial reaction has appeared to subside, the reaction mixture be allowed to stand at room temperature for a time before working up the product or that the temperature of the reaction mixture be increased after sufficient time has elapsed for an exothermic reaction to have occurred.

As has already been pointed out, formation of the presently provided [(perfluoroalkyl)alkyl] aryl dialkylphosphinates takes place by condensation of one mole of a dialkylphosphinic chloride or bromide with one mole of the appropriate phenol. Hence the reactants are advantageously employed in such stoichiometric proportions. However, an excess of the phenol may be employed, and such excess is recommended when it is desired to assure complete reaction of the more difficultly available dihydrocarbylphosphinic halide reactant. An excess reactant may be readily recovered from the final reaction mixture, e.g., by distillation. When a basic scavenger is used, the phosphinate product is conveniently isolated from the reaction mixture by first removing the hydrohalide by-product, e.g., through water-washing, and then fractionally distilling the residual organic phase in order to remove any unreacted reactant, organic base, diluent, etc., that may be present. When operating in the absence of a base, it is advantageous to provide for mechanical removal of the by-product hydrogen halide, e.g., by vigorous agitation of the reaction mixture, dephlegmation, etc.

The presently provided (perfluoroalkyl)alkyl-substituted phenyl dialkylphosphinates are stable, well characterized, normally liquid materials. They are of particular interest for use as functional fluids, since they are generally fluid over wide temperature ranges, remaining liquid at temperatures which are substantially higher than 400° F., possess high flash points and high ignition points, are extremely resistant to attack by moisture, and are characterized by very good thermal stability. Hence they are eminently suited for use as hydraulic fluids, especially in hydraulic systems which are subpected to widely varying temperature conditions and exposure to water. The present compounds possess good viscosity/temperature relationships and are also useful, e.g., as heat-exchange media, gyro fluids, and lubricants.

Evalution of the hydraulic fluid efficacy of the fluorine-containing phenyl dialkylphosphinates was conducted by determining such characteristics as pour point, kinematic viscosity, ASTM slope, autogenous ignition temperature and behavior upon sudden exposure to very high temperatures. The following procedures were used to obtain the data given in the working examples which follow:

The pour point was determined by American Society for Testing Materials (hereinafter referred to as ASTM) procedure D97–57.

Kinematic viscosity was determined by ASTM D445-T 1960 procedure, using ASTM kinematic viscosity thermometers which had been calibrated against National Bureau of Standards resistance thermometers.

ASTM slope was determined from the curve plotted from viscosity data on ASTM viscosity-temperature chart D341 over the temperature range 100° C. to 210° C.

The flash points and fire points were determined by ASTM D92–57 procedure.

The autogenous ignition temperature was determined by ASTM D60-T procedure.

Flammability at 1300° F. was determined by visual observation of the behavior of the test material when introduced dropwise at the surface of molten aluminum which is maintained at 1300° F. If no burning resulted, a single spark was applied for a more stringent test of fire resistance.

Vapor pressure and thermal stability measurements, including the decomposition point, were conducted by employing substantially the method described by E. S. Blake et al., J. Chem. Eng. Data, 6, 87 (1961), using the isoteniscope, constant temperature bath and vacuum handling system. The decomposition temperature is here defined as the temperature at which $dp/dt$ (rate of pressure change) due to the decomposition of the sample is 0.014 mm. Hg/sec.

Figure 2:
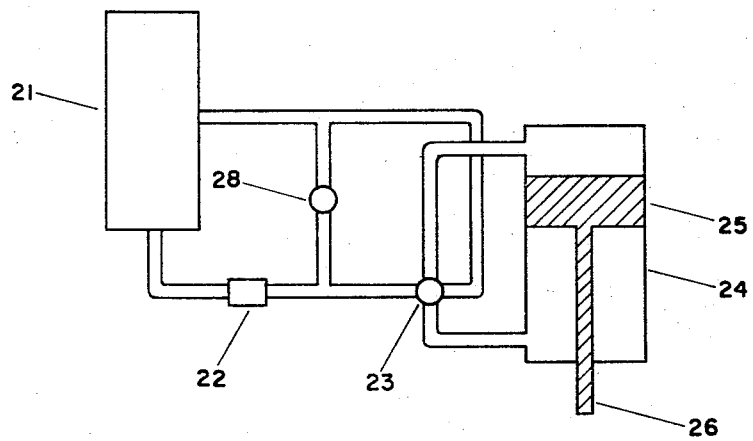

The present phosphinates are thus useful as the operative fluids of hydraulic systems. Such systems comprise a displaceable member and a displacing force which is transmitted to said member by means of said fluid, as shown in the schematic diagram of FIGURE 1 of the drawings. Here, a displacing force is applied to piston 1 and transmitted through the fluid 2 contained in cylinder 3 whence it travels through line 4 into cylinder 5 where it acts on the displaceable member 6. In such a system, actuation of a moveable member by the presently provided fluid gives performance characteristics which are outstanding because of the physical properties of the fluid. While hydraulic systems will contain such elements as pumps, valves, cylinders and pistons, the efficacy of the system necessarily depends upon the fluid, since the fluid must be one which can withstand pressure and remain fluid under the conditions of use. FIGURE 2 of the drawings is a schematic diagram which well illustrates the indispensable role of the fluid in cooperation with other components of a hydraulic system. Here the fluid is stored in reservoir 21, and is pumped therefrom by means of pump 22 and though the directional control valve 23 into either end of cylinder 24, where it acts on piston 25 connected by shaft 26 to a motor (not shown) or other device which converts the hydraulic pressure applied to piston 25 into mechanical energy. Action of the fluid on piston 25 displaces the piston until it reaches the end of its travel. The piston may be caused to travel in either direction by adjustment of the directional valve 23. Valve 23 provides for return of the fluid from the opposite side of the piston, back to reservoir 21. Relief valve 28 is provided to maintain a constant hydraulic pressure within the system. When a predetermined pressure is reached, the fluid will flow back to reservoir 21 by functioning of said relief valve.

Owing to their very good fire-retardant properties, the present phosphinates are particularly useful in hydraulic pressure devices that are employed under conditions wherein any leak or break in the hydraulic system could provide great danger of fire. The low pour points of the present compounds permit fabrication of pressure devices which are destined for use in cold climates, and their very good vapor pressure characteristics and stability to heat allows use of the same devices in hot environments. The viscosity characteristics and ASTM slopes of the fluids make them of great utility for the transmission of power in a hydraulic system having a pump therein which supplies power for the system, e.g., in a fluid motor comprising a constant- or variable-discharge piston pump which is caused to rotate by the pressure of the hydraulic fluid of the system. The present fluid likewise serves to lubricate the frictional, moving parts of such hydraulic systems.

For use in a conventional automatic transmission, the presently provided hydraulic fluid is contained in the outer casing of the transmission device, which casing is attached to the usual engine crankshaft and flywheel and rotates therewith. Within the fluid is a coupling comprising an impeller connected to said casing and a turbine which is connected to the drive shaft of the vehicle. The turbine is driven by the motion of the fluid in response to the rotation of the impeller, as the casing to which the impeller is attached is actuated by the crankshaft and flywheel..

The presently described [(perfluoroalkyl)-alkyl]aryl dialkylphosphinates are particularly suited for use as the operative fluids in hydraulic braking devices owing to their very good vapor pressure characteristics. Under current, severe operating conditions heat build-up within the brake system is frequently encountered. Unless the fluid remains liquid at the high temperatures thus developed, the hydraulic brake system becomes inoperable since the vaporized fluid becomes compressible. Although much effort has been expended at providing high boiling hydraulic brake fluids, generally materials which are high boiling congeal at low temperatures. The presently provided fluids have boiling points which are well over 400° F. and some of them do not boil until over 600° F. Hence hydraulic brake systems in which these fluids are used withstand the dangers ensuing from heat build-up. At the same time, owing to the low pour points of the fluids, the system is one which is operable in very cold environment. The present invention thus provides an improved method for applying pressure to a hydraulic brake through a fluid.

The presently provided compounds and mixtures are useful as the hydraulic fluids of hydraulic machines, generally, e.g., lifts, hoists, jacks, lockgates, presses, etc.

The invention is further illustrated by, but not limited to, the following examples.

*Example 1*

A solution of 13.8 g. (0.05 mole) of p-(2,2,3,3,4,4,4-heptafluorobutyl)phenol in 30 ml. of benzene was dried azeotropically. The remaining solution was allowed to cool and then slowly added to a mixture of 9.9 g. (0.05 mole) of dibutylphosphonic chloride and 50 ml. of pyridine with ice-cooling. The whole was stirred at room temperature for about three hours during which time pyridine hydrochloride gradually precipitated. After standing overnight, the reaction mixture was refluxed for about an hour in order to complete the reaction. The benzene and pyridine were removed by distillation up to 100° C./10 mm. The residue was dissolved in chloroform (250 ml.) and the solution was successively washed with 3 N potassium hydroxide, 3 N hydrochloric acid and water to neutrality. After filtering, the chloroform was removed up to 100° C./9 mm. Distillation of the residue gave 20.0 g. (92% theoretical yield) of the crude phosphinate, B.P. 136–137° C./0.15 mm., $n_D^{25}$ 1.4420, which upon redistillation gave 16 g. of the substantially pure p-(2,2,3,3,4,4,4-heptafluorobutyl)phenyl dibutylphosphinate, B.P. 145–149° C./0.4 mm., $n_D^{25}$ 1.4410, analyzing as follows:

Found, percent: C, 49.70; H, 5.62; F, 30.70; P, 6.95. Calc. for $C_{18}H_{24}H_7O_2P$, percent: C, 49.55; H, 5.54; F, 30.48; P, 7.10.

Nuclear magnetic resonance for $^{31}P$ showed a single peak at −56.6 p.p.m. characteristic of the phosphinate structure.

The pour point of the p-(2,2,3,3,4,4,4-heptafluorobutyl)phenyl dibutylphosphinate was −30° F. (supercooled). The following kinematic viscosities were determined at the temperatures shown below:

| ° F. | Centistokes |
|---|---|
| 100 | 36.5 |
| 150 | 10.4 |
| 210 | 3.93 |

The ASTM slope was 0.95 for the 100–210° F. range.

The autoignition temperature was 905° F. for 0.07 ml. with a lag of 5 seconds. A flash point of 457° F. and a fire point of 558° F. were obtained. This phosphinate did not burn in the absence of spark in the molten metal test of 1300° F.

The compound had a decomposition point of 511° F.

*Example 2*

In this example, the hydrolytic stability of two different phosphinates was compared. The following procedure was employed:

Weighed samples (approximately 1 g.) were sealed in glass tubes wth 5 ml. of water and 25 ml. of purified dioxane. They were then heated at 200° F. for 48, 96 and 168 hours. A blank, containing only water and dioxane, was also run with each fluid sample. Titration of samples and blanks with standard base gave a measure of the extent of hydrolysis after a 96 hour test period and after a 168 hour test period. The milliequivalents of standard base required per gram of sample was determined by the equation:

$$\text{meq./gm.} = \frac{\text{ml. (titration)} \times \text{normality}}{\text{wt. sample}}$$

The following results were obtained:

| Test compound | Meq. Acid/g. sample | |
|---|---|---|
| | 96 hours | 168 hours |
| m-(3-trifluoromethyl)phenyl dibutylphosphinate | 0.24 | 0.52 |
| p-(2,2,3,3,4,4,4-heptafluorobutyl)phenyl dibutylphosphinate | 0.06 | 0.07 |

Both of the above compounds are dibutylphosphinates. Generally in the aliphatic series the higher the halogen content of a compound the lower its hydrolytic stability. Accordingly, it is truly remarkable that the hydrolytic stability of the (heptafluorobutyl)phenyl dibutylphosphinate after 168 hours is so much higher than that of the corresponding (trifluoromethyl)phenyl compound. Also, the hydrolysis rate of said trifluoromethyl compound is greatly increased upon standing whereas no such increase is noted with the said heptafluorobutyl compound.

The operative fluid of the present hydraulic systems and methods may be a mixture of one or more of the isomeric o, m or p-[(perfluoroalkyl)alkyl]phenyl dialkylphosphinates. In some instances, it will be found that those of the compounds having meta- and/or ortho substitution at the phenyl nucleus possess better fluidity than do the para-substituted compounds. Also, the alkyl portion of the phosphinates may be varied. Thus there may be used mixed dialkylphosphinates, i.e., compounds in which the two alkyl radicals are dissimilar or mixtures of two or more different, simple or mixed dialkylphosphinates. The presently provided phosphinates may also be mixed with known hydraulic fluids, e.g., the trialkyl phosphates or the dialkyl arylphosphonates or the aromatic polyethers, so long as the properties of the resulting mixture meet the specifications required of a hydraulic fluid for the intended use. Obviously if the intended use places no limitation on such factors as either low- or high-temperature behavior, or if no fire-hazard exists, the present compounds may be included in any proportion. However, if one or more of these factors is important, then care should be observed in preventing an undesired extent of dilution. Generally, at least a major component of the mixture should be the [(perfluoroalkyl)alkyl]phenyl dialkylphosphinate.

Also, the usual fluid additives, e.g., corrosion inhibitors, antioxidants, viscosity-index improvers, etc., may be added to the presently provided fluid phosphinates, although for most purposes it will be found that such additives can be dispensed with.

It is to be understood that although the invention has been described with specific reference to particular embodiments thereof, it is not to be so limited since changes and alterations therein may be made which are within the full intended scope of this invention as defined by the appended claims.

What we claim is:

1. A compound of the formula

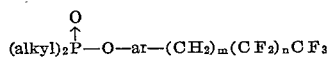

$$(\text{alkyl})_2\overset{\text{O}}{\underset{}{\text{P}}}-\text{O}-\text{ar}-(\text{CH}_2)_m(\text{CF}_2)_n\text{CF}_3$$

in which alkyl has from 1 to 8 carbon atoms, ar is a bivalent aromatic hydrocarbon radical which is free of olefinic and acetylenic unsaturation and has from 6 to 12 carbon atoms, $m$ is a number of from 1 to 4 and $n$ is a number of zero to 4.

2. The compound defined in claim 1, further limited in that ar is phenylene.
3. The compound defined in claim 1, further limited in that each alkyl is butyl.
4. (2,2,3,3,4,4,4-heptafluorobutyl)phenyl dibutylphosphinate.
5. p-(2,2,3,3,4,4,4 - heptafluorobutyl)phenyl dibutylphosphinate.

References Cited

UNITED STATES PATENTS

| | | | |
|---|---|---|---|
| 2,632,018 | 3/1953 | Kosolapoff | 260—461 |
| 3,038,924 | 6/1962 | Schoot et al. | 260—461 |
| 3,074,889 | 1/1963 | Attwood | 252—78 |
| 3,104,259 | 9/1963 | Harwood et al. | 260—973 X |
| 3,113,110 | 12/1963 | Luechauer | 252—78 |
| 3,162,672 | 12/1964 | Richert et al. | 260—973 X |

CHARLES B. PARKER, *Primary Examiner.*

F. M. SIKORA, A. H. SUTTO, *Assistant Examiners.*

UNITED STATES PATENT OFFICE
CERTIFICATE OF CORRECTION

Patent No. 3,340,331 September 5, 1967

George A. Richardson et al.

It is hereby certified that error appears in the above numbered patent requiring correction and that the said Letters Patent should read as corrected below.

Column 1, line 49, strike out "alkyl, ar, m and n are defined above and X is" and insert instead -- alkyl has from 1 to 8 carbon atoms, ar is an --; column 3, line 60, for "subpected" read -- subjected --.

Signed and sealed this 8th day of April 1969.

(SEAL)
Attest:

Edward M. Fletcher, Jr.
Attesting Officer

EDWARD J. BRENNER
Commissioner of Patents